United States Patent
Chiu

(10) Patent No.: US 6,681,748 B1
(45) Date of Patent: Jan. 27, 2004

(54) SECONDARY COOLING SYSTEM FOR A VEHICULAR INTAKE BOOSTER

(76) Inventor: Hsiang-Lan Chiu, No. 159, Lane 247, Da Chiao 1st St., Yung Kang City, Tainan Hsien (TW)

( * ) Notice: Subject to any disclaimer, the term of this patent is extended or adjusted under 35 U.S.C. 154(b) by 0 days.

(21) Appl. No.: 10/388,429

(22) Filed: Mar. 17, 2003

(51) Int. Cl.$^7$ ................................................. F01P 3/12
(52) U.S. Cl. ..................................................... 123/542
(58) Field of Search ................................. 123/542, 540, 123/184.21

(56) References Cited

U.S. PATENT DOCUMENTS 5,626,112 A * 5/1997 Liao ........................ 123/184.21
6,394,076 B1 * 5/2002 Hudelson ..................... 123/540
6,453,659 B1 * 9/2002 Van Liere et al. .......... 123/542

* cited by examiner

Primary Examiner—Marguerite McMahon
(74) Attorney, Agent, or Firm—Rosenberg, Klein & Lee

(57) ABSTRACT

A secondary cooling system for a vehicular intake booster includes a fixture and an intake booster connected by a connection hole provided in the fixture, a retaining part of the fixture being fixed to a condensing pipe of an air cooling system in a vehicle; a keyway being provided at the bottom of the fixture, and a plurality of through holes being provided between the connection hole and the keyway to increase combustion efficiency by having the air to be cooled by the condensing pipe before entering into the intake manifold.

8 Claims, 10 Drawing Sheets

SECONDARY COOLING SYSTEM FOR A VEHICULAR INTAKE BOOSTER

BACKGROUND OF THE INVENTION (a) Field of the Invention

The present invention relates to a secondary cooling system for a vehicular intake booster, and more particularly, to one that is mounted to a condensing pipe by means of a fixture to lower the intake temperature for improving combustion efficiency.

(b) Description of the Prior Art

Whereas the intake system of the prior art in an engine of a vehicle takes in the fresh air through an air filter by relying on a vacuum suction generated by the intake manifold of a carburetor, various types of intake boosters have been developed, such as that taught in U.S. Pat. No. 5,626,112. However, a running engine has been already in its higher temperature, the intake booster though improves the intake, the air sucked in by the intake booster through its air inlet is also at higher temperature, resulting in that the air entering into the carburetor is at higher temperature. The air at higher temperature means that the density of particles in the air is comparatively low, and the combustion efficiency of the mixture of the air and the fuel is compromised. The optimal atomization of the fuel is achieved if the air admitted to the carburetor is maintained at 40° C. for achieving the consistent mixture ratio and preventing the capacity efficiency from being affected by the overheated mixture. With the performance of the engine kept at its ideal condition, exhaust of air pollutants including HC, CO and CO2, can be reduced while saving the fuel consumption. Therefore, the best combustion efficiency can be achieved if the air admitted into the engine is kept at a lower temperature. However, those intake boosters are prevented from giving their best benefits due to the air admitted is of higher temperature.

SUMMARY OF THE INVENTION

The primary purpose of the present invention is to provide a seconding cooling system for a vehicular intake booster, that lowers the temperature of the air entering into the engine, improves combustion efficiency and can be fixed to the condensing pipe of various sizes. To achieve the purpose, a fixture is provided with a connection hole, a keyway is provided at the bottom of the fixture, and a plurality of through holes are provided between the connection hole and the keyway so that the intake booster can be accommodated in the fixture while the keyway strides over the condensing pipe for the air passing through the keyway is cooled before entering via those through holes into the intake booster.

DETAILED DESCRIPTION OF THE PREFERRED EMBODIMENTS

Figure 1:
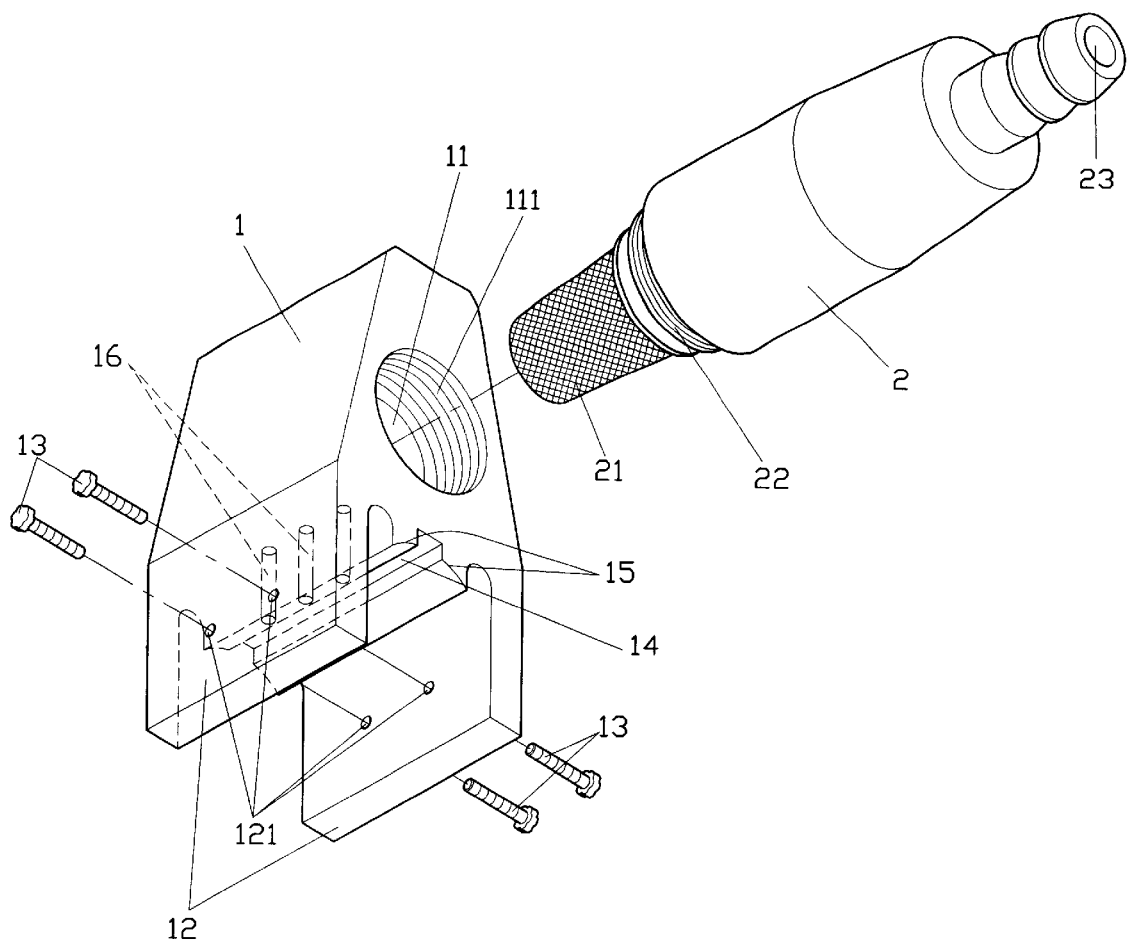
FIG. 1 is an exploded view of a first preferred embodiment of the present invention.

Referring to FIG. 1, a first preferred embodiment of the present invention includes a fixture (1) and an intake booster (2).

The fixture (1) is mounted to a condensing pipe in an air conditioning system provided in an engine chamber of a vehicle. The frond edge of the fixture (1) is provided with a connection hole (11), and a female thread (111) is provided inside the connection hole (11). A retaining part (12) is provided at the bottom of the fixture (1), and a plurality of through holes (121) are provided on the outer wall of the retaining part (12) to respectively receive insertion of a plurality of locking bolts (13). A keyway (14) is provided at the bottom of the fixture (1), and two stoppers (15) are each provided on two sides of the keyway (14) while a plurality of through holes (16) connected through the connection hole (11) are provided in the keyway (14).

The intake booster (2) (not described here as the structure and working principle of the intake booster are prior arts) is provided at one end an air inlet (21) adapted with a strainer in extremely minute mesh to prevent ingression of water containment. The outer edge of the air inlet (21) is provided with a male thread (22) to be engaged with the female thread (111) inside the connection hole (11) of the fixture (1) while an air outlet (23) is provided at the other end of the intake booster (2).

Figure 2:
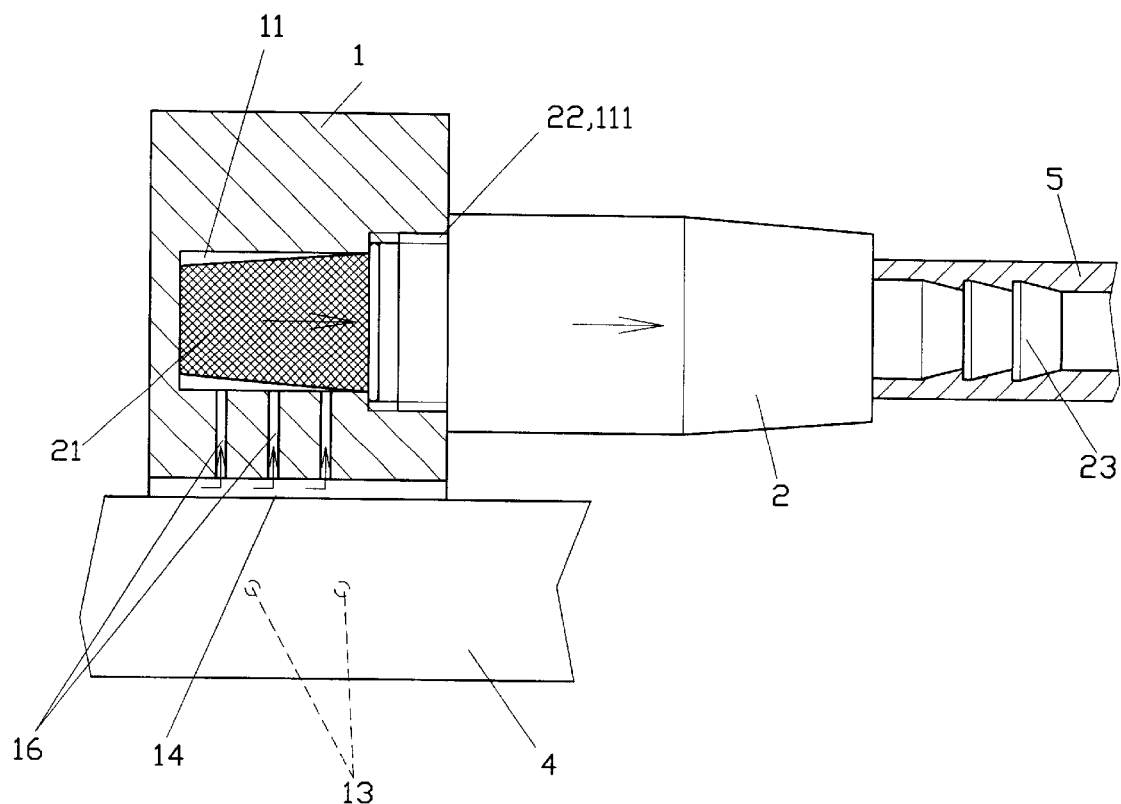
FIG. 2 is a sectional view and also as a view of the operation of the first embodiment of the present invention as assembled.
Figure 3:
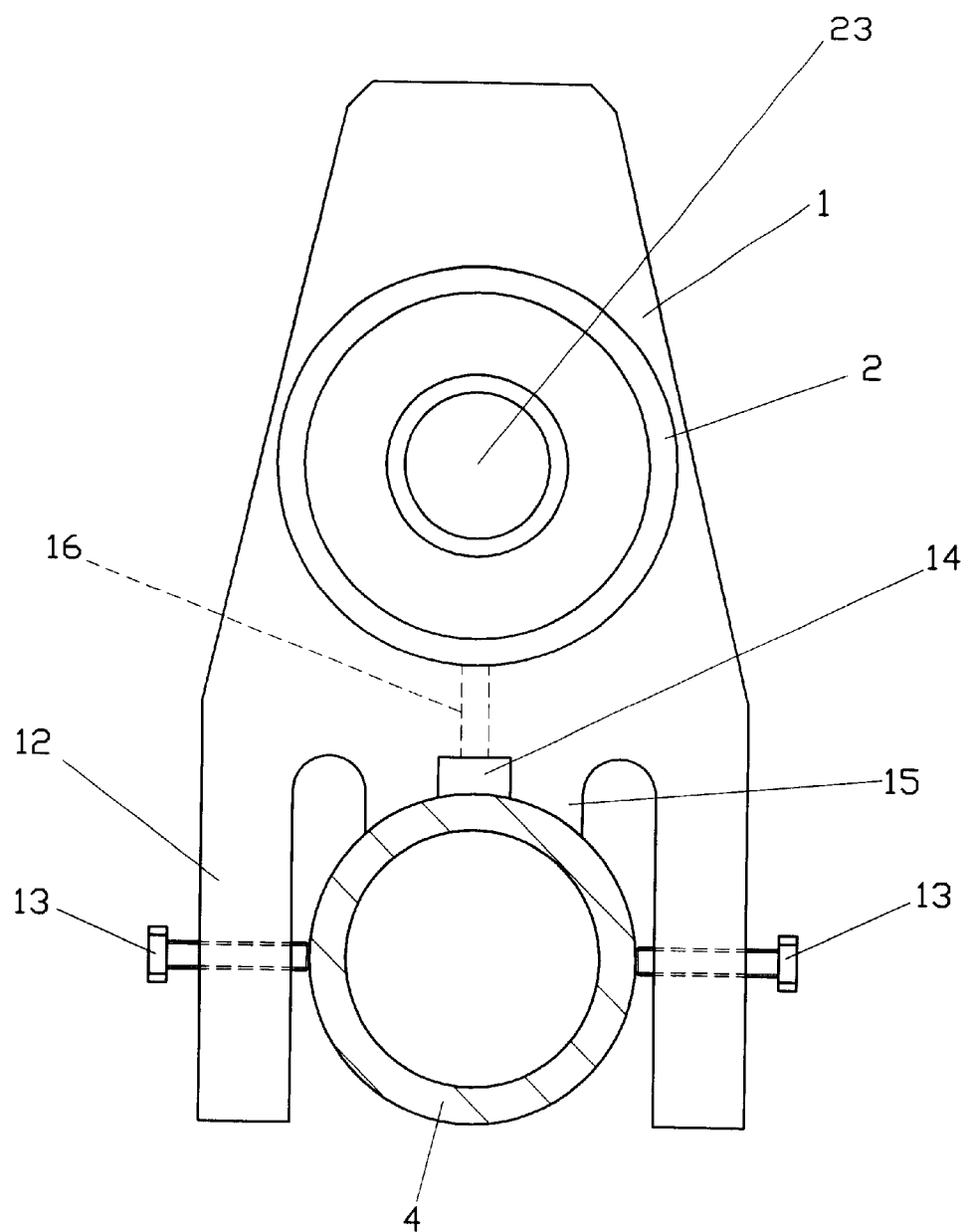
FIG. 3 is a view showing the first preferred embodiment as assembled.

In practice as illustrated in FIGS. 2 and 3, the retaining part (12) of the fixture (1) strides over a condensing pipe (4) of the air conditioning system provided inside the engine chamber of the vehicle to such that the condensing pipe is accommodated in the space defined by the retaining part (12) with the outer wall of the condensing pipe (4) to rest on the inner edge of the retaining part (12) before tightening inwardly the locking bolts (13) provided on the outer wall of the retaining part (12) for the tips respectively of the locking bolts (13) to hold against the outer wall of the condensing pipe (4) thus to secure in position the fixture (1) to the condensing pipe (4) disregarding the size of the condensing pipe (4). An air pipe (5) is sleeved onto the air outlet (23) of the intake booster (2) to connect through an air filter provided inside the engine chamber, and further to the pipeline of the intake manifold. Therefore, once the engine starts, vacuum suction generated by the intake manifold to activate the intake booster (2) to take in air, which is sucked in through the keyway (14) to pass through the condensing pipe (4). Whereas the temperature of the outer wall of the condensing pipe (4) descends due to coolant flowing inside the condensing pipe (4), the temperature of the air passing through the outer wall of the condensing pipe (4) is significantly reduced. The cool air enters into the connection hole (11) through the through holes (16), and further into the intake booster (2) via the air inlet (21) to flow into the air pipe (5) out of the air outlet (23) before entering the intake manifold.

Figure 4:
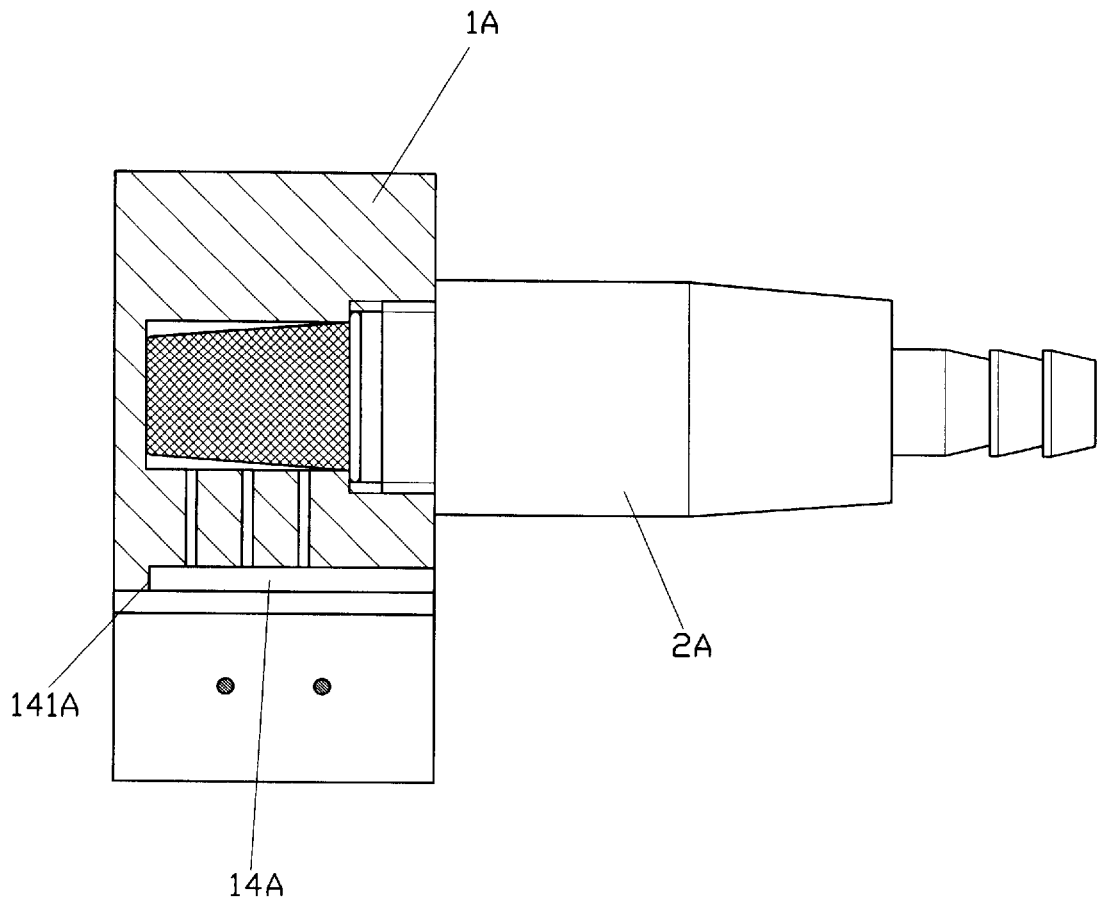
FIG. 4 is a sectional view of a second preferred embodiment of the present invention as assembled.

Now referring to FIG. 4, a second preferred embodiment of the present invention comprised of a fixture (1A) and an intake booster (2A) differs from the first preferred embodiment in that one end of a keyway (14A) of the second preferred embodiment is a closed end (141A) to increase the intake amount by reducing the air loss flowing through the end.

Figure 5:
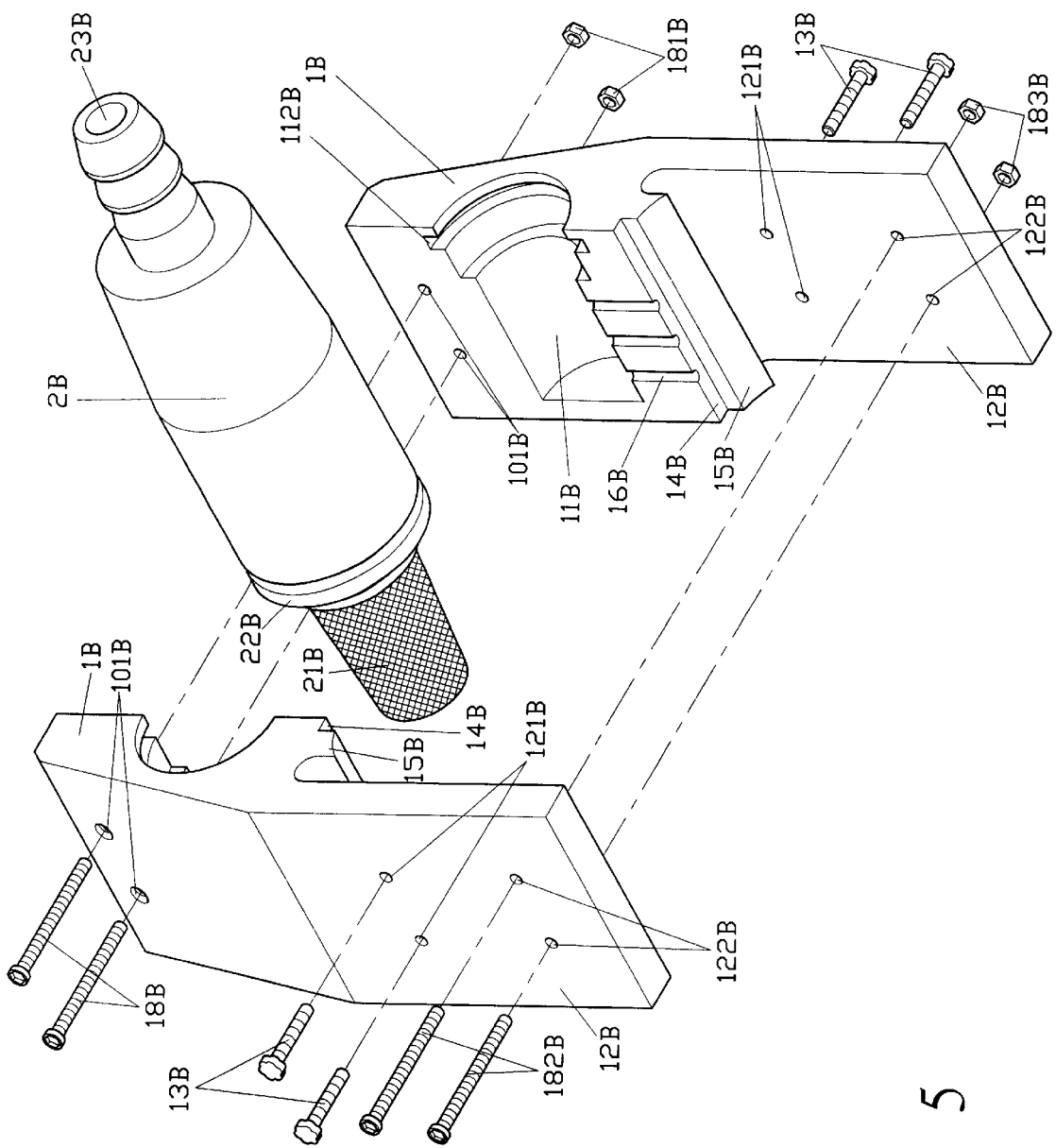
FIG. 5 is an exploded view of a third preferred embodiment of the present invention.

As illustrated in FIG. 5, a third preferred embodiment of the present invention is provided in two identical halves of a fixture (1B) that are incorporated to each other and fixed to the condensing pipe of the air conditioning system provided inside the engine chamber of the vehicle. A connection hole (11B) with a groove (112B) is provided at the front edge of each half of the fixture (1B). A plurality of through holes (101B) are provided on the outer edge of each half of the fixture (1B) to respectively receive insertion of a screw (18B) and a nut (181B). A retaining part (12B) is provided to each half of the fixture (1B), and a plurality of through holes (121B) are provided on the outer wall of each retaining part (12B) to receive the respective insertion of a locking bolt (13B). A keyway (14B) is provided at the bottom of each half of the fixture (1B), and two stoppers (15B) are each respectively provided on the two sides of the keyway (14B). A plurality of through holes (16B) connected through the connection hole (11B) are provided in the keyway (14B). The outer edge at the bottom of the retaining part (12B) is provided with a plurality of through holes (122B) to respectively receive insertion of a screw (182B) and a nut (183B).

An intake booster (2B) is mounted in the connection hole (11B) of the fixture (1B). One end of the intake booster (2B) is provided with an air inlet (21B) adapted with a strainer, a flange (22B) is provided on the circumferential edge of the air inlet (21B), and another end of the intake booster (2B) is provided with an air outlet (23B).

When assembled, both halves of the fixture (1B) are abutted to each other to wrap up the air inlet (21B) of the intake booster (2B) so that the flange (22B) rests in the groove (112B) of the fixture (1B) and the intake booster (2B) is secured in position inside the connection hole (11B) of the fixture (1B) by inserting each the screw (18B) and the nut (181B) into the through hole (101B) of the fixture (1B). The condensing pipe (4) is placed in the retaining part (12B) and secured in position by tightening up each the locking bolt (13B), and finally, the screws (182B) and the nuts (183B) are used to insert into the through holes (122B) in the retaining part (12B) for the fixture (1B) to be secured to the condensing pipe (4) to provide the equivalent results to that by the first preferred embodiment of the present invention.

Figure 6:
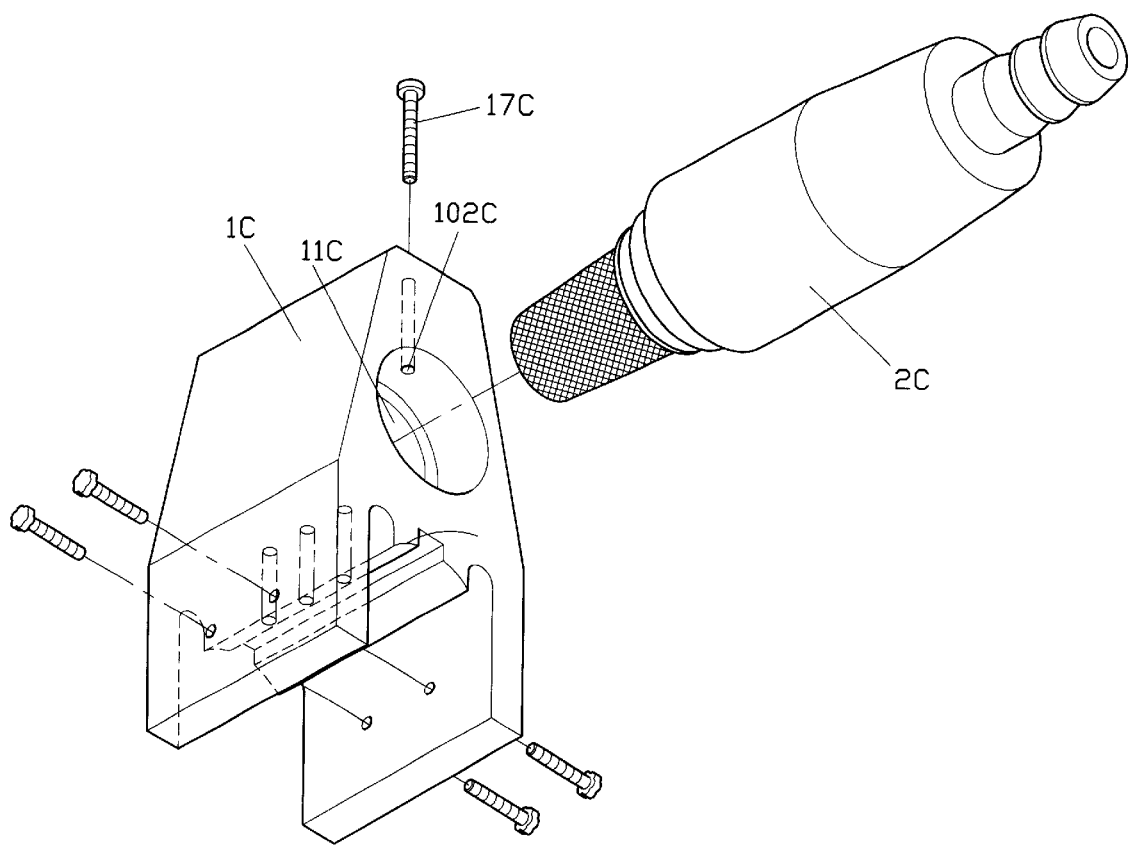
FIG. 6 is an exploded view of a fourth preferred embodiment of the present invention.

As illustrated in FIG. 6, a fourth preferred embodiment of the present invention includes a fixture (1C) and an intake booster (2C) in the structure substantially identical to that of the first preferred embodiment of the present invention, and differs in that there is no female thread provided to the front edge of a connection hole (11C) of the fixture (1C), and there is no male thread provided to the intake booster (2C). A threaded hole (102C) is provided vertically over the fixture (1C) to receive the insertion of a bolt (17C) to secure the intake booster (2C) in position.

Figure 7:
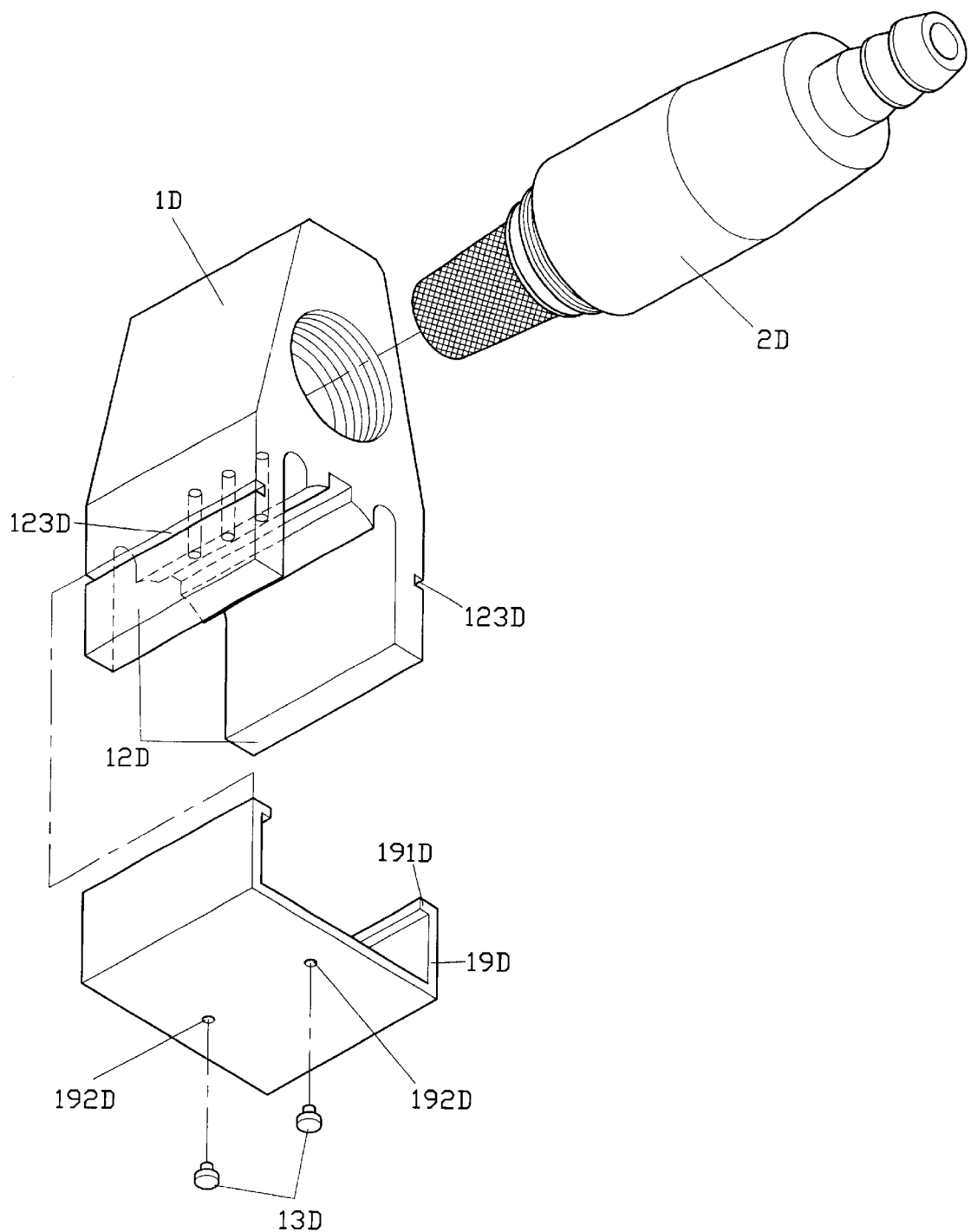
FIG. 7 is an exploded view of a fifth preferred embodiment of the present invention.

A fifth preferred embodiment of the present invention as illustrated in FIG. 7 comprises a fixture (1D) and an intake booster (2D). The structure of both of the fixture (1D) and the intake booster (2D) is substantially identical to that of the first preferred embodiment with the exception that a groove (123D) is each provided on the two outer surface of a retaining part (12D) of the fixture (1D) to respectively receive the insertion of a wall (191D) each provided on the upper edge on two sides of a U-shaped frame (19D), and threaded holes (192D) are provided at the bottom of the frame (19D) to be inserted with bolts (13D) to hold the condensing pipe (4) in position.

Figure 8:
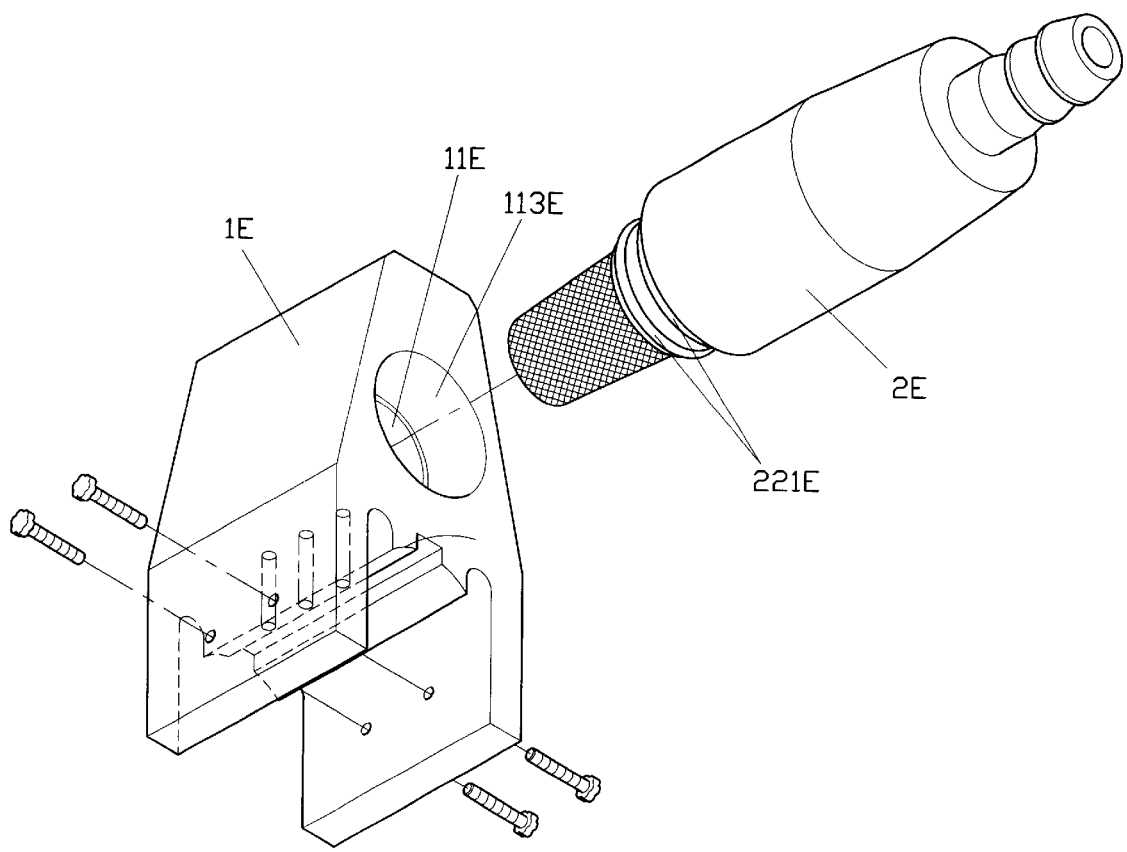
FIG. 8 is an exploded view of a sixth preferred embodiment of the present invention.

As illustrated in FIG. 8, a sixth preferred embodiment of the present invention comprises a fixture (1E) and an intake booster (2E). The structure of both of the fixture (1E) and the intake booster (2E) is substantially identical to that of the first preferred embodiment with the exception that a conic hole (113E) instead of a female thread is provided to the front end of a connection hole (11E) of the fixture (1); relatively, two O-rings (221E), instead of a male thread, are provided to the intake booster (2E) to have the O-rings (221E) to be packed in the relative conic hole (113E) to fix the intake booster (2E).

Figure 9:
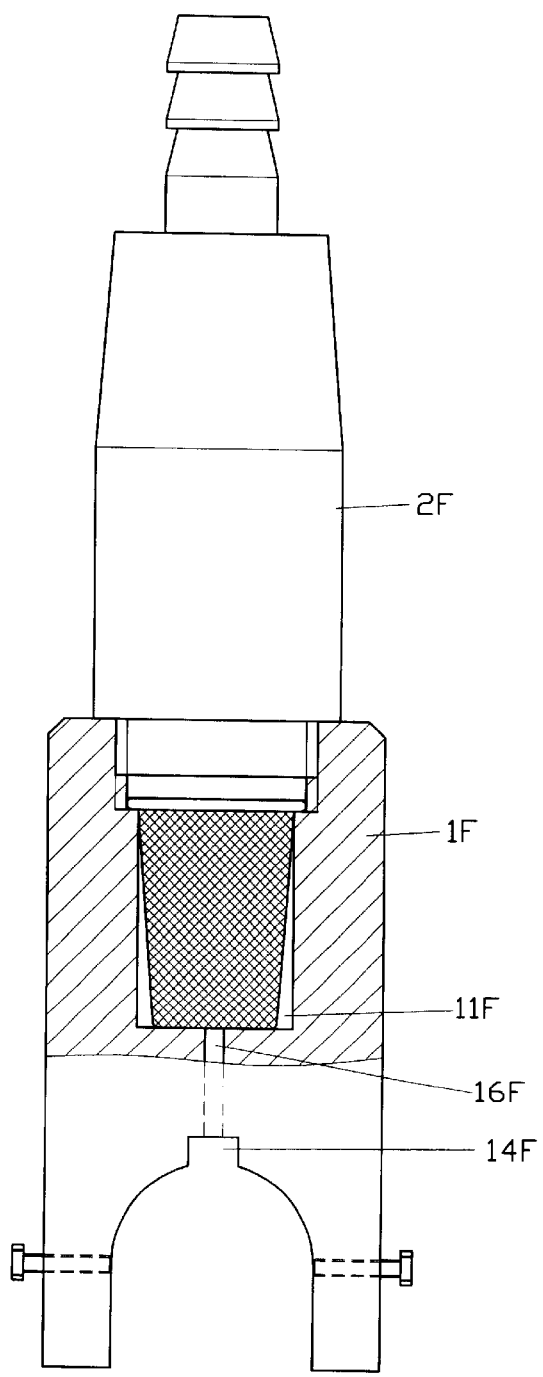
FIG. 9 is a sectional view of a seventh preferred embodiment of the present invention as assembled.

Now referring to FIG. 9, a seventh preferred embodiment of the present invention comprises a fixture (1F) and an intake booster (2F). The structure of both of the fixture (1F) and the intake booster (2F) is substantially identical to that of the first preferred embodiment with the exception that a connection hole (11F) of the fixture (1F) is vertically provided on the fixture (1F) and is connected through through holes (16F) and a keyway (14F).

Figure 10:
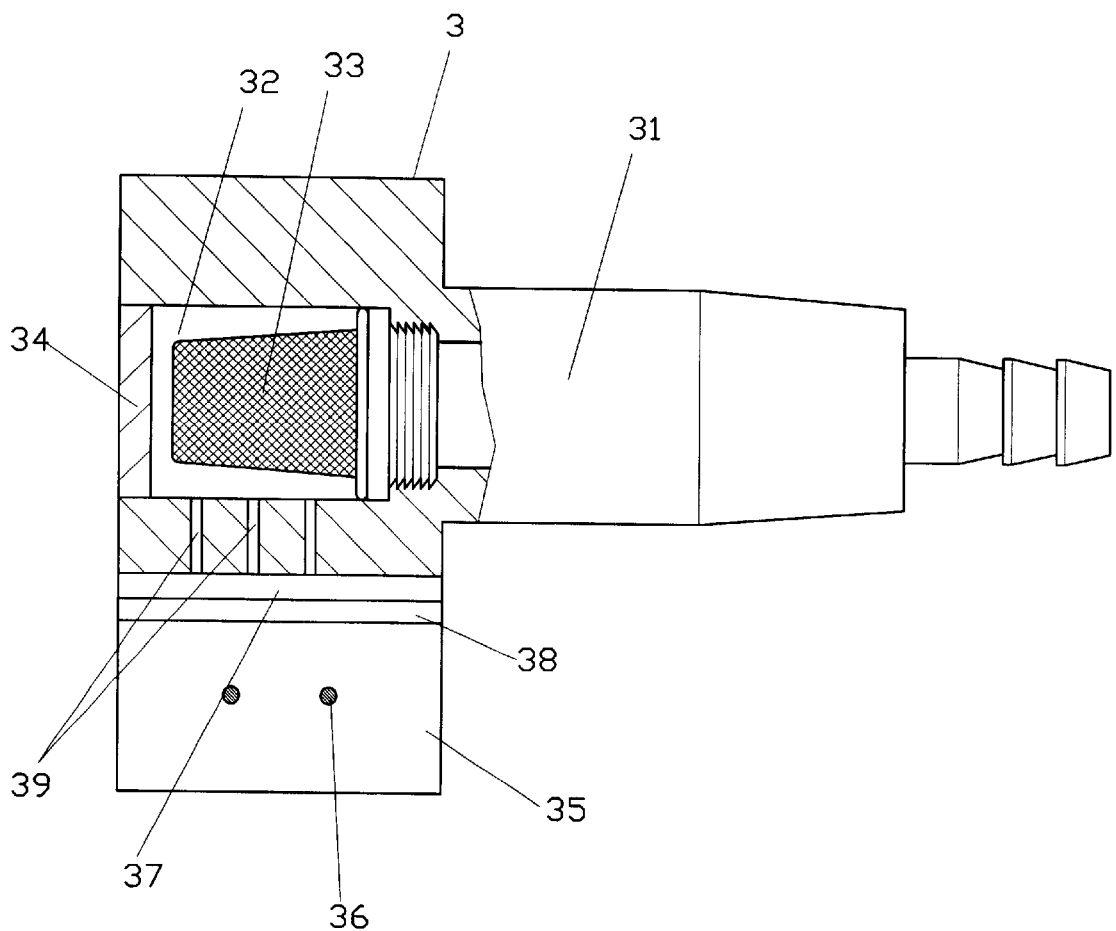
FIG. 10 is a sectional view of an eighth preferred embodiment of the present invention as assembled.

An eighth preferred embodiment of the present invention as illustrated in FIG. 10 essentially comprises a fixture (3) integrated with an intake booster (31). A connection hole (32) adapted with a female thread is provided at the rear edge of the fixture (3) and is screwed to a strainer (33), which is blocked at the opening end of the connection hole (32) with a plug (34). A retaining part (35) is provided at the bottom of the fixture (3). The outer wall of the retaining part (35) is respectively penetrated with a plurality of locking bolts (36). A keyway (37) is also provided at the bottom of the fixture (3). Two sides of the keyway (37) are respectively provided with a stopper (38). A plurality of through holes (39) passing through the connection hole (32) are provided in the keyway (37) to achieve the same purpose of providing a secondary cooling system to the intake booster.

As described above, the present invention provides the following advantages:

1. By cooling effects provided from the condensing pipe, the present invention lowers the temperature of the intake air to increase the density of particles in the air so to improve the combustion efficiency of the mixture of air and fuel.
2. The fixture disclosed in the present invention is universal to condensing pipes of various sizes, thus is adaptable to various types of the vehicle to achieve the optimal use in common.

I claim:

1. A secondary cooling system for a vehicular intake booster comprising:
    a fixture being mounted to a condensing pipe of an air cooling system in an engine chamber of a vehicle; and
    an intake booster being mounted to the fixture, and having an air inlet and an air outlet, characterized by that:
        the fixture having a connection hole to receive the intake booster in the fixture, a keyway being provided at a bottom of the fixture, a plurality of through holes being provided between the connection hole and the keyway, and the keyway striding over the condensing pipe for air to be cooled while passing through the keyway before entering into the intake booster via the through holes.
2. The secondary cooling system for a vehicular intake booster as claimed in claim 1, wherein, a retaining part is provided at the bottom of the fixture; a plurality of locking bolts being respectively inserted through an outer wall of the retaining part, and a stopper being each respectively provided on two sides of the keyway.

3. The secondary cooling system for a vehicular intake booster as claimed in claim 1, wherein, the fixture is made into two identical halves to be abutted to each other, a groove being provided to the connection hole, outer edges of both the fixture and the retaining part being secured in position by means of a plurality of screws and nuts, and a flange being provided on a circumferential edge of the air inlet of the intake booster to be inserted into the groove inside the fixture.

4. The secondary cooling system for a vehicular intake booster as claimed in claim 1, wherein, a screwed hole is vertically provided to the fixture to receive insertion of a bolt to fix the intake booster in position.

5. The secondary cooling system for a vehicular intake booster as claimed in claim 1, wherein, the connection hole having a female thread is provided at a front edge of the fixture to hold the intake booster in position.

6. The secondary cooling system for a vehicular intake booster as claimed in claim 1, wherein, a conic hole is provided at a front edge of the connection hole of the fixture and two O-rings are relatively provided to the intake booster; and the O-rings being packed into the conic hole to hold the intake booster in position.

7. The secondary cooling system for a vehicular intake booster as claimed in claim 1, wherein, a pair of grooves is provided to the outer edge of the retaining part of the fixture; a U-shaped frame having provided on an upper edge of two sides an insertion wall to engage the grooves; and threaded holes being provided at a bottom of the frame to receive insertion of bolts to hold the condensing pipe in position.

8. The secondary cooling system for a vehicular intake booster as claimed in claim 1, wherein, the fixture is integrated with the intake booster, a connection hole adapted with a female thread being provided at a rear edge of the fixture, and a strainer being screwed inside the connection hole, and being blocked at an opening end of the connection hole with a plug.

\* \* \* \* \*